H. O. V. BERGSTRÖM.
METHOD OF PRODUCING METHYL ALCOHOL OR OTHER VOLATILE SUBSTANCES FROM WOOD OR OTHER MATERIAL CONTAINING CELLULOSE.
APPLICATION FILED APR. 30, 1912.

1,129,542.

Patented Feb. 23, 1915.

2 SHEETS—SHEET 1.

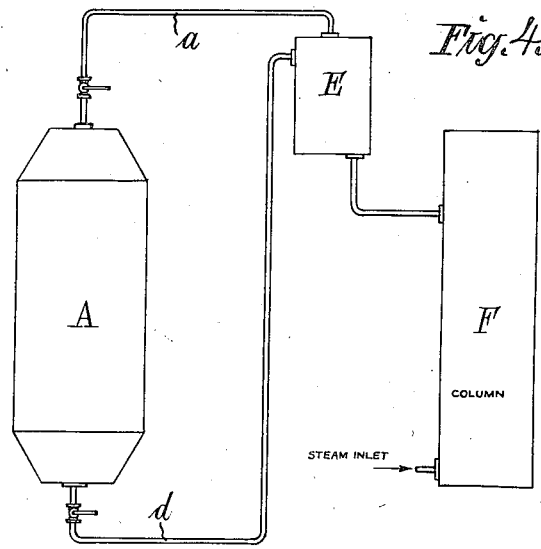
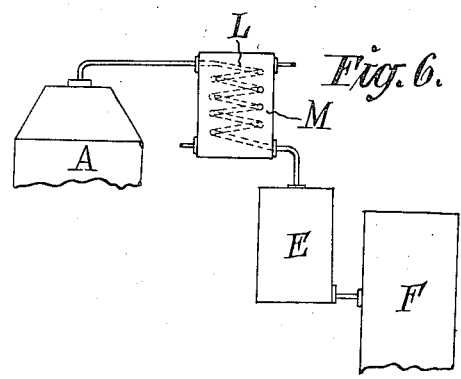

UNITED STATES PATENT OFFICE.

HILDING OLOF VIDAR BERGSTRÖM, OF STOCKHOLM, SWEDEN.

METHOD OF PRODUCING METHYL ALCOHOL OR OTHER VOLATILE SUBSTANCES FROM WOOD OR OTHER MATERIAL CONTAINING CELLULOSE.

1,129,542.  Specification of Letters Patent.  Patented Feb. 23, 1915.

Application filed April 30, 1912. Serial No. 694,131.

*To all whom it may concern:*

Be it known that I, HILDING OLOF VIDAR BERGSTRÖM, a subject of the King of Sweden, and resident of Kungsholmsgatan 6, Stockholm, in the Kingdom of Sweden, have invented certain new and useful Improvements in the Methods of Producing Methyl Alcohol or other Volatile Substances from Wood or other Material Containing Cellulose, of which the following is a specification, reference being had to the accompanying drawing.

A series of investigations made by the inventor has proved, that, when boiling a material containing cellulose with diluted acids, such as sulfuric acid or sulfurous acid, either alone or containing other chemicals, for instance calcium bisulfite, and with or without pressure, methyl alcohol, acetone, acetaldehyde and other substances which can be volatilized with steam are formed. The said substances may be recovered according to the present invention whereby the process for the execution of which the above mentioned boiling was performed, may be rendered more profitable. As an example of such a process according to which a material containing cellulose is boiled with a diluted acid containing a chemical substance, I cite in the following description the boiling of wood according to the so called sulfite method for the production of wood pulp. The boiling of the wood is hereby executed under pressure. The vapors being from time to time let out from the boiler contain some of the methyl alcohol, acetone, aldehyde and other volatile substances formed during the boiling, the remainder of the same being in the resulting boiling lye. In this case to wit, the sulfite method the vapors from the boiler as well as the lye contain sulfurous acid. Now, my present invention refers to a method of recovering said substances from the vapors escaping from the boilers and from the resulting boiling lye.

In the following I give an example of the practical execution of the present invention in combination with the boiling of wood according to the sulfite method, reference being had to the accompanying drawing, in which—

Figure 1:
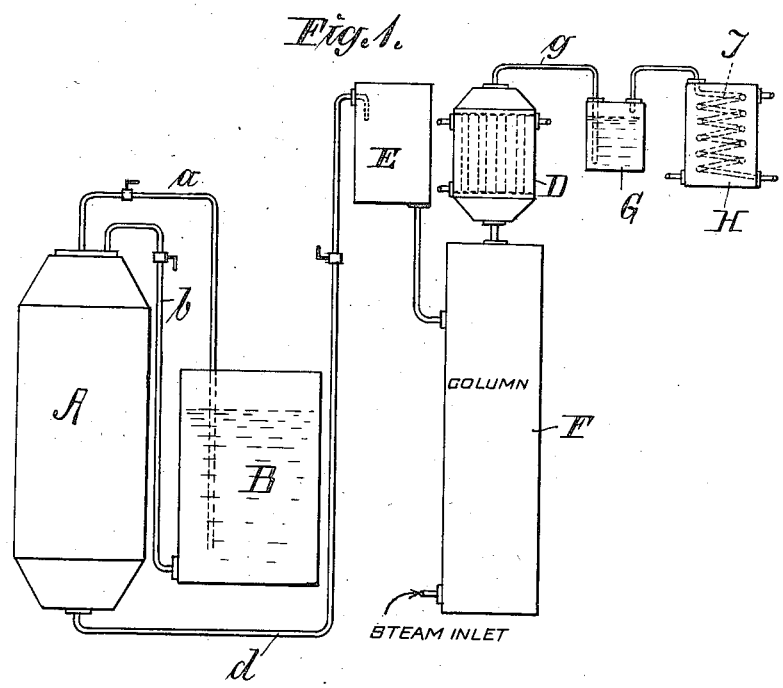

Figure 1 diagrammatically illustrates an apparatus for this purpose and Figs. 2, 3, 4, 5 and 6 show modified details.

In the boiler A wood chips are boiled under pressure which may vary from two to fifteen atmospheres with a lye consisting of water, calcium bisulfite and free sulfurous acid, the boiling operation being conducted at a temperature of about 135° C. During the boiling operation, especially at the end of the same, vapors are let out from the boiler, which contain among other substances methyl alcohol and sulfurous acid. These vapors are led by the tube $a$ into the vessel B containing lye prepared for use in a subsequent boiling operation. In the vessel B the said vapors are condensed and the lye in B is enriched with methyl alcohol among other products. After the wood pulp and lye in which it was boiled have been tapped out from the boiler A the latter is again filled with wood chip and lye for boiling them is introduced into A from B by the tube $b$. The boiler A is closed and the boiling takes place in the ordinary manner. At the end of this boiling operation the vapors are again led from the boiler A by the tube $a$ into the vessel B containing lye prepared for use in a subsequent boiling operation, and so on. The resulting boiling lye which had been enriched, before being introduced into A, with methyl alcohol by the vapors from the preceding boiling operation, and in which fresh quantities of methyl alcohol have been formed during the last boiling process, is led through the tube $d$ into a vessel E from which it is then led into the column apparatus F, in which it runs down in opposite direction to steam introduced or generated at the lower end of the same. This causes a mixture of vapors, containing methyl alcohol and sulfurous acid, to escape from the column apparatus F which may, if necessary be provided with a deflegmator D. The vapors escaping from the boiler may also be led into the lye resulting from a preceding boiling operation (as shown in Fig. 4) and this lye may be led through the column apparatus in the above manner. For example, the vapors may be led from A by tube $a$ into the vessel E containing lye from a preceding boiling operation, the lye having been introduced into E through the tube $d$ by means of the pressure existing in A at the end of a boiling operation. For separating sulfurous acid from this mixture of vapors several methods may be used. As indicated in the drawing the vapors may for instance be led through a vessel G containing lime water or other matter which can bind sulfurous acid. Then the resulting vapors are led through a serpentine J cooled by means of water or other cooling medium in the vessel H; the liquid of condensation running out from the serpentine J contains methyl alcohol in a concentrated form. The vessel G may be omitted and the mixture of vapors be led through the tube $g$ directly into the serpentine J, (see Fig. 5). The liquid of condensation obtained contains both methyl alcohol and sulfurous acid. From this liquid of condensation both substances may be separated in a suitable manner, for instance by adding lime water or other matter binding sulfurous acid to the same. Or the sulfurous acid may be driven out from the liquid of condensation by heating the same, whereby the heating may be effected by means of vapors formed during the execution of the process. This may for instance be performed by leading the liquid of condensation as a cooling agent through the deflegmator D, whereby it is heated so that the sulfurous acid is driven off.

Figure 2:
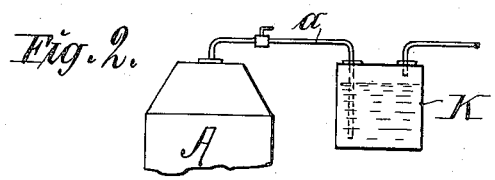
Figure 3:
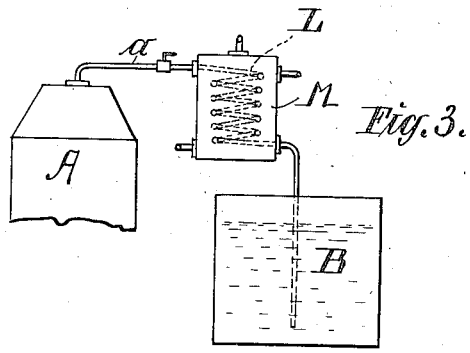

The present invention is not limited to the above described manner, but several modifications may be employed without going beyond the scope of the same. Thus, it may in many cases be convenient to remove the sulfurous acid from the vapors escaping from the boiler, before they are led into the liquid in the vessel B. This may be effected, as shown in Fig. 2, by leading the vapors through the tube $a$ into the vessel K containing lime water or other matter for binding the sulfurous acid. Another manner of removing sulfurous acid is shown in Fig. 3, where the tube $a$ is combined with a serpentine L surrounded by liquid of condensation, which is led through the vessel M and acts as a cooling agent. The vapors escaping from the boiler through the serpentine L heat the said liquid of condensation, so that sulfurous acid is wholly or partially driven out of the same.

The percentage of methyl alcohol in the vapors escaping from the boiler is about seven times as high as in the resulting boiling lye. Therefore, it may sometimes be suitable to recover only the part of the methyl alcohol which is contained in the vapors, but not that part which is contained in the lye. In this case a similar arrangement to that shown in Fig. 3 is used; here the liquid of condensation coming from the serpentine L is, however, not led into the vessel B, but is introduced into a vessel E from which it is led into the column apparatus (see Fig. 6). The cooling is effected in the vessel M, at least to some extent by means of liquid of condensation obtained. If, however, the starting material for the production of methyl alcohol consists of liquid of condensation obtained from the vapors escaping from the boiler or of the resulting boiling lye the concentration of the same is performed in a column apparatus. Here the column apparatus may either be worked in such manner that a finished product is directly obtained, or the starting material may be concentrated to a certain degree in the column apparatus and then be distilled once more, if necessary in combination with treatment with chemicals. The chemicals which may be employed for this are acids, alkalis and other substances which can remove the impurities principally consisting of aldehydes and sulfurous acid (if such acid was present in the starting material).

As is well known ethyl alcohol can be produced by boiling wood with diluted acids. It has been found to be very suitable to combine the present invention with the said method in order to obtain the ethyl alcohol as free as possible from methyl alcohol and, furthermore, to render such production of ethyl alcohol more profitable. However, the methyl alcohol is formed not only when wood is boiled with diluted acids, but also with water. This case has not been considered in the foregoing on account of the fact that, soon after the beginning of the boiling, the water is enriched with acetic acid and other acids, so that in this case the wood is in practice boiled with diluted acids except during the first minutes. Thus, the boiling of wood with water also comes within the limits of the present invention.

Having now described my invention, what I claim as new and desire to secure by Letters Patent is:

1. The herein described method of producing methyl alcohol, consisting in boiling cellulosic material with water containing an acid or acid mixture at a temperature below that at which the cellulosic material is charred, leading the vapors escaping from the boilers into lye prepared for use in a subsequent boiling operation, introducing said lye into the boiler and boiling cellulosic material with same, taking out from the boiler the lye resulting after this boiling operation, leading said resulting lye through a column apparatus, condensing the vapors escaping therefrom and treating the liquid of condensation for recovering methyl alcohol, substantially as described.

2. The herein described method of producing methyl alcohol, consisting in boiling cellulosic material in water containing an acid or acid mixture at a temperature below that at which the cellulosic material is charred, leading the vapors escaping from the boiler into the lye resulting from a previous boiling operation, driving said lye through a column apparatus, leading the vapors escaping therefrom through a solution for binding the impurities, condensing said vapors, and treating the liquid of condensation for recovering methyl alcohol, substantially as described.

3. The herein described method of producing methyl alcohol, which consists in boiling cellulosic material in water containing an acid or acid mixture at a temperature below that at which the cellulosic material is charred, leading the vapors escaping from the lye into lye prepared for use in a subsequent boiling operation, driving the resulting lye previously enriched with such vapors through the deflegmator of a column apparatus and then through this apparatus, leading said vapors through a solution binding impurities, condensing said vapors and treating the resulting liquid thus freed from sulfurous acid for recovering methyl alcohol from the same, substantially as described.

4. The herein described method of producing methyl alcohol, consisting in boiling cellulosic material with water containing an acid or acid mixture at a temperature below that at which the cellulose material is charred, leading the vapors generated from the lye through a cooling device, and using as a cooling agent in said cooling device liquid of condensation obtained from said vapors, substantially as described.

In witness whereof, I have hereunto signed my name in the presence of two subscribing witnesses.

HILDING OLOF VIDAR BERGSTRÖM.

Witnesses:
AXEL EHRNER,
EVELA PENN.